Patented Mar. 26, 1929.

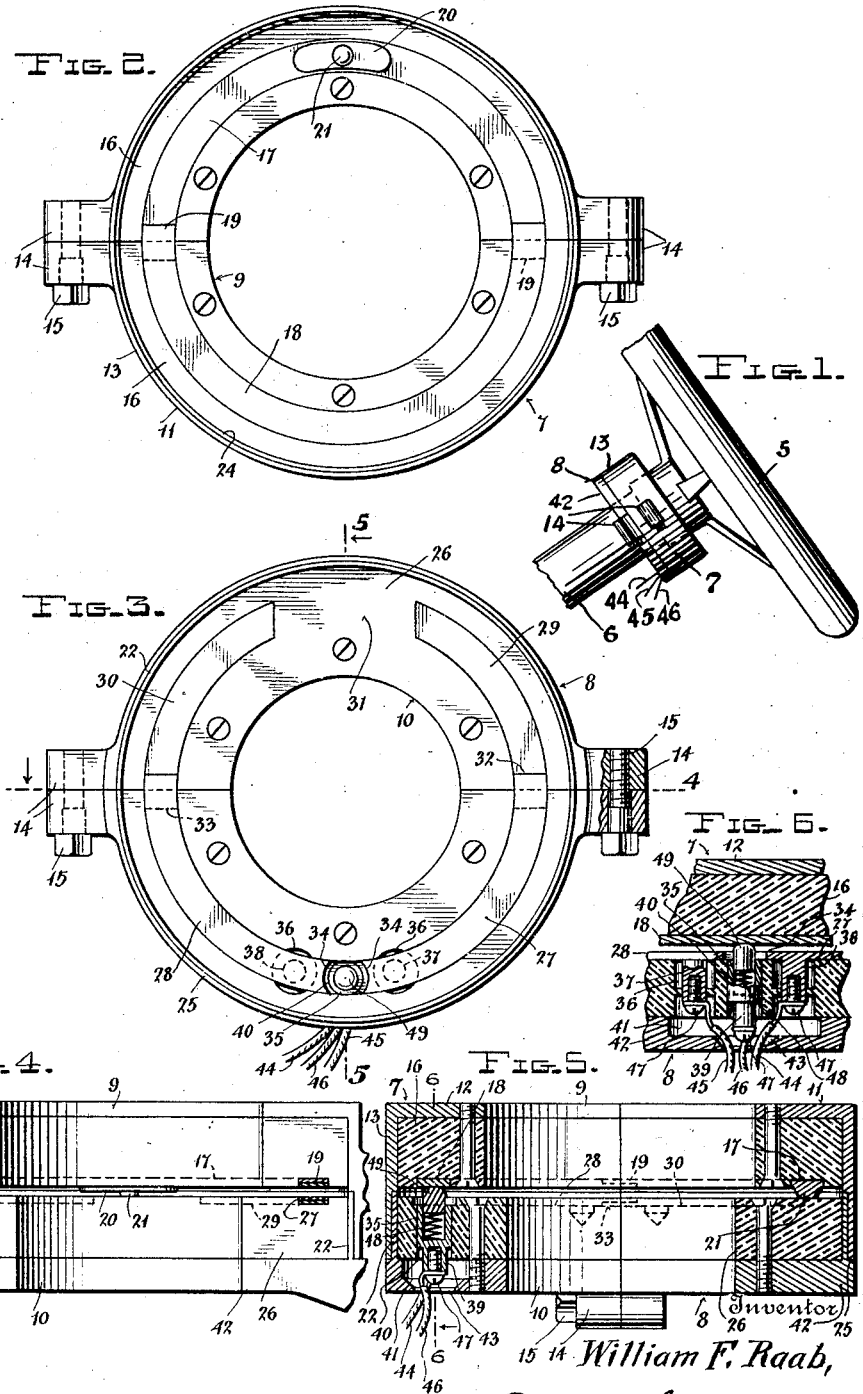

1,707,176

UNITED STATES PATENT OFFICE.

WILLIAM F. RAAB, OF NEW YORK, N. Y.

CIRCUIT-CLOSING DEVICE.

Application filed May 2, 1924. Serial No. 710,602.

This invention relates to a circuit closing device for application to the steering post of an automotive vehicle and which is actuated by the turning movement of the steering wheel of the vehicle to close electric circuits to an electrically illuminated indicator at the rear end of the vehicle to indicate to the driver of a following vehicle that the automobile equipped with such device is about to turn a corner to the right or left or to pull over to the right or left.

A further object of the invention is to provide a device of the character just mentioned which may be readily applied to automobiles in use or during factory construction thereof, and which is adapted to be applied to steering wheels and posts or columns of different sizes and designs.

With these and other objects and advantages in view, the invention consists in the construction and arrangement of the several parts which will be more fully explained in the subjoined description and set forth in the appended claims.

In the drawings:

Fig. 1 is a side elevation of a steering wheel and a portion of a steering post or column of an automobile having the improved device applied thereto;

Fig. 2 is an enlarged top plan view of the lower section or member of the device which is applied to the steering post or column of an automobile;

Fig. 3 is a view similar to Fig. 2, showing the top section or member of the device which is secured to the steering wheel, this member being inverted and the view illustrating the bottom thereof;

Fig. 4 is a transverse vertical section on the line 4—4, Fig. 3, with both sections or members shown by Figs. 2 and 3 assembled;

Fig. 5 is a section on the line 5—5, Fig. 3, through the two members assembled and in a plane at a right angle to the section shown by Fig. 4; and Fig. 6 is a section on the line 6—6, Fig. 5.

In the drawings 5 indicates the steering wheel of an automotive vehicle and 6 the steering column thereof, and 7 and 8 indicate, respectively, a pair of cooperating switch sections or members. The section or member 7 is secured to the center or hub of the steering wheel and is freely movable with the latter, and the section or member 8 is fixed to the steering post or column 6, the two members or sections having interfitting relation as clearly shown by Figs. 4 and 5. Both sections or members 7 and 8 are preferably circular in contour and the section or member 7 has a central opening 9 to receive the hub of the steering wheel 5 and the section or member 8 has a central opening 10 to receive the steering post or column 6. The member or section 7 comprises an outer, preferably metallic, casing 11 with an inwardly projecting top flange 12, and the section or member 8 has a surrounding casing 13 which also is preferably formed of metal. For convenience in applying the improved attachment to the steering wheel and steering post or column of automobiles which have been structurally completed and are in use, the two sections or members 7 and 8 are formed in semicircular halves, including all the parts thereof, the two halves being separably connected through the medium of diametrically opposed apertured and screw-threaded lugs or ears 14, to receive removable bolts or connecting pins 15, which are also screw-threaded, as particularly shown in section by Fig. 3. The cap section or member 7 contains an insulating ring comprising semi-circular sections 16, which are jointed in line with the opposite joints of the metallic casing 7, this insulating ring being of a width equal to the top flange 12, and imbedded and secured in the insulating ring is a metallic conducting ring consisting of two semicircular sections 17 and 18, which have overlapped ends 19, to provide for a flush fitting and continuity of the conducting means. At a certain location on one of the conducting ring sections 17 or 18 and as shown in the ring section 17, an auxiliary metal conducting strip 20 is secured and has a central projection 21.

The section or member 8 has a peripheral flange 22, which is continuous with relation to the two sections of the said section or member, to fit within the peripheral flange 23 of the two parts of the section or member 7, and an internal shoulder 24 is formed in the flange 23, whereby the flange 22 may fit within the flange 23, and the edge of the flange 23 bears against an external shoulder 25 of the surrounding casing of the bottom section or member 8. By this means a close fitting of the two sections or members 7 and 8 is provided, but the section or member 7 is freely rotatable on the section or member 8. The section or member differs somewhat in its construction and arrangements of parts relatively to the section or member 7. Within the flange 22 of the section or member 8 is a ring of insulating material comprising semicircular sections 26, which are of greater width than the sections 16 of the section or member 7 in view of the smaller opening 10 formed in the center of the said member or section 8. Embedded and secured in the one section 26 of the section or member 8 are two segmental conducting strips 27 and 28, preferably formed of metal, and in the other insulating ring section 26 are shorter segmental conducting strips 29 and 30, the adjacent ends of the strips 29 and 30 being separated by a gap of considerable width, as at 31, by the insulating material of the ring section 36. The abutting ends of the conducting strips 27 and 29 and of the strips 28 and 30 are overlapped, as at 32 and 33, so that the strips 29 and 30 form in effect continuations of the strips 27 and 28, respectively. The adjacent ends of the strips 27 and 28 are separated and each of said ends is concaved, as at 34, around and above but separated from the upper terminal of a metallic cup or socket 35 secured in the insulating material and having its highest point terminating below the conducting strips 27 and 28, and depending from the adjacent terminals of the latter conducting strips into openings 36 through the insulating material are internally screw-threaded sockets 37 and 38. The cup or socket 35 has a depending hollow interiorly screw-threaded stem 39, the said socket 35 and its stem 39 being mounted in an opening 40 between the openings 36 and separated from the latter openings by the insulating material of the one segmental section 26. The hollow stem 39 is practically a socket of less diameter than the main portion of the socket above the same and extends into and through a recess 41 in the bottom metallic flange 42 of the section or member 8, the latter having an opening 43 therethrough in central relation to the recess 41, to permit the introduction and securement of insulated circuit wires 44, 45 and 46, the terminals of these wires being secured to the respective sockets 37, 38 and 39 by screws 47, as clearly shown by Figs. 5 and 6. Within the centrally located main socket 35 a spring 48 is mounted, and fitted thereover and freely movable in the said socket is a metallic push-button or anti-frictional member 49, which is held by said spring in continual contact with the conducting ring composed of the sections 17 and 18 of the cap section or member 7.

The improved attachment just explained is electrically connected to any suitable direction indicating means installed at the rear of the automobile or other vehicle.

The wire 46 connected to the tubular stem 39 of the socket 40 in which the spring-actuated contact member or button 49 is mounted is connected to one pole of a source of electric current (not shown). The wire 44 is connected to one terminal of the electric lamp of the signaling device to indicate a right-hand turn and the wire 45 is connected to one terminal of the electric lamp to indicate a left-hand turn. The other terminals of said electric lamps are connected in any suitable manner to the opposite pole of the source of electric current from the wire 46. The illumination of either of the signal lights will depend upon the movement of the steering wheel 5 carrying the section or member 7 and rotatably associated with the section or member 8 fixed to the steering post or column 6 as shown by Fig. 1. When the contact projection of the auxiliary conducting strip 20 is located within the gap 31 and bears upon the insulating material between the adjacent ends of the said metal connecting strips 29 and 30, neither of the signalling lights will be illuminated, but when the steering lever is turned to the right or left, the contact projection 21 will engage either the segmental conducting strip 29 or the similar strip 30 and close the electric circuit to the appropriate signaling light in accordance with the turning or change of direction of movement of the automobile as effected by the driver. In completing the circuit it will be observed that the central wire 46 connecting with the socket 40 and the push-button or yielding contact 49 will always bring the same pole of the source of electric current into operation with relation to either of the circuits embodying the wires 44 and 45, and that the movable character of the push-button or yielding contact 49 reduces the friction between the same and the connecting strip 18 carried by the upper section or member 7 and the circuit will be completed by the contact projection of the auxiliary strip 20 when in engagement with either of the said metal conducting strips 29 or 30.

The insulating material mounted in the two sections or members 7 and 8 and in which the connecting strips 18, 17, 27, 28, 29 and 30 are mounted is preferably formed of a suitable phenol condensation product. It will be understood, however, that any suitable insulating material may be used. Moreover, as hereinbefore explained, for convenience in applying the device to the steering wheel or post or column, the sections or members 7 and 8 are formed in two parts so that they may be readily applied in operative position and secured. When the device is applied to an automobile during the manufacture of the latter, the sectional feature of the sections or members 7 and 8 may be eliminated and the same operation as to control of direction means at the rear of the machine will practically ensue by the turning movement of the steering wheel.

It is also proposed to modify the proportions, dimensions and minor details of construction and arrangement of the several parts to accommodate various applications of the device to different types of steering wheels and posts or columns.

What is claimed as new is:

A steering wheel and post control switch of the class specified, comprising two interfitting relatively rotatable members, of circular contour, each of said members having a central circular opening therethrough, the opening of one of said members being adapted to receive and be secured to the hub of the steering wheel of a vehicle and the opening of the other member being adapted to receive and be secured to the steering post of such vehicle, said first named member having a lower recess to fit over the last named member and having an insulation therein in which is embedded a metallic conducting ring consisting of two semi-circular sections having overlapped ends, one of the sections having an auxiliary conducting strip projecting from one face thereof and formed with a central projection, the other member likewise having an insulating section therein in which are embedded two metallic segmental conducting strips of which a pair of the opposed ends are separated by a gap, a metallic cup carried by the latter member between and spaced from the other pair of the opposed ends of said conducting strips, said cup having a terminal for connection to an electrical conductor, terminals for connection with electrical conductors depending from said conducting strips adjacent the latter ends of said strips, and a spring actuated button in said cup and held in continual contact with the conducting ring of said first named member.

In testimony whereof I have hereunto set my hand.

WILLIAM F. RAAB.